United States Patent
Liu et al.

(10) Patent No.: US 6,775,208 B1
(45) Date of Patent: Aug. 10, 2004

(54) METHOD FOR CONTROLLING FOCUS SPEED OF A PICK-UP HEAD

(75) Inventors: Ching-Hwa Liu, Taipei (TW); Chun-Hsiang Tsai, Taipei (TW); Wei-Hsin Hsu, Taipei (TW)

(73) Assignee: Asustek Computer Inc., Taipei (TW)

( * ) Notice: Subject to any disclaimer, the term of this patent is extended or adjusted under 35 U.S.C. 154(b) by 715 days.

(21) Appl. No.: 09/654,909

(22) Filed: Sep. 5, 2000

(30) Foreign Application Priority Data

Nov. 26, 1999 (TW) .................................... 88120698 A

(51) Int. Cl.$^7$ ................................................ G11B 7/00
(52) U.S. Cl. .................... 369/44.28; 369/44.25; 369/53.28; 369/94
(58) Field of Search ........................ 369/44.11, 44.14, 369/44.17, 44.25, 44.26, 44.28, 44.29, 44.34, 44.35, 44.36, 94, 53.25, 53.28, 53.31, 53.4, 53.2, 53.23, 53.3

(56) References Cited

U.S. PATENT DOCUMENTS

| | | |
|---|---|---|
| 4,783,774 A | 11/1988 | Enomoto |
| 5,246,476 A | 9/1993 | Yoshimura et al. |
| 5,289,097 A | 2/1994 | Erickson et al. |
| 5,345,347 A | 9/1994 | Hopkins et al. |
| 5,793,721 A * | 8/1998 | Akkermans ............... 369/44.27 |
| 5,859,824 A * | 1/1999 | Izumi et al. ............. 369/44.29 |
| 6,307,820 B2 * | 10/2001 | Takeya et al. ........... 369/44.29 |

* cited by examiner

*Primary Examiner*—Thang V. Tran
*Assistant Examiner*—Bach Vuong
(74) *Attorney, Agent, or Firm*—Rabin & Berdo, P.C.

(57) ABSTRACT

The present invention provides a method for controlling a focus speed of a pick-up head while performing a layer jump operation over a multi-layer optical disk in an optical information reproducing apparatus. The optical information reproducing apparatus includes the pick-up head, an actuator and a counter. The pick-up head has an objective lens positioned over a first focus of the multi-layer optical disk and in response to a signal reflected from the multi-layer optical disk, will generate a RF level signal and. The actuator is electronically connected to the pick-up head for driving the objective lens to perform the layer jump operation in response to a kick pulse signal. The counter generates a counter value in response to the kick pulse signal. The method comprises the steps of sending the kick pulse signal to the actuator for kicking the objective lens out of the first focus; processing the RF level signal and the counter value for generating a speed control data according to a predetermined procedure; and driving the objective lens to a second focus through the actuator in response to the speed control data.

5 Claims, 11 Drawing Sheets

METHOD FOR CONTROLLING FOCUS SPEED OF A PICK-UP HEAD

BACKGROUND OF THE INVENTION

1. Field of the Invention

The present invention relates to a method for controlling the focus speed of a pick-up head, and more particularly, to the method for controlling the focus speed of the pick-up head while performing a layer jump operation over a multi-layer optical disk in an optical information reproducing device.

2. Description of the Related Art

An optical information reproducing device, such as CD-ROM\DVD-ROM\CD-RW\DVD-RAM, has been widely applied in multimedia computer systems and becomes one basic element of the computer systems. Some U.S. Pat. Nos., i.e. 4,783,774, 5,289,097, 5,246,479 and 5,345,347 may be referred in order to have an in-depth understanding of the optical information reproducing device.

Please refer to FIG. 1. FIG. 1 shows a function block diagram of a conventional optical information reproducing device 10. Typically, an optical information reproducing device 10 includes a pick-up head 12, a pre-amplifier 14, a digital signal processor 16, a microprocessor 18, a servo controller 20, a driver circuit 22 and an actuator 24. The pick-up head 12 is for reading data stored on an optical disk 26. The pre-amplifier 14 is electronically connected to the pick-up head 12 for amplifying the signal of data read from the optical disk 26 and generating an analog signal of reading data. The digital signal processor 16 is electronically connected to the pre-amplifier 14 for receiving the analog signal of reading data and generating a digital signal of reading data. The microprocessor 18 is electronically connected to the digital signal processor 16 for processing the digital signal of reading data according to a predetermined procedure. The servo controller 20 is electronically connected to the microprocessor 18, digital signal processor 16 and pre-amplifier 14 for detecting and processing the signal of servo data read from the optical disc 26, wherein the servo data includes servo burst, synchronous pulse and track number etc. The driver circuit 22 is electronically connected to the servo controller 15 for providing an actuating driving signal. The actuator 24 is electronically connected to the driver circuit 22 and pick-up head 12 for driving the pick-up head 12 to different radial positions in response to the actuating driving signal, or kicking an objective lens (not shown) of the pick-up head 12 to a focus on the optical disk 26 in response to another actuating driving signal.

Please refer to FIG. 2. FIG. 2 shows a schematic diagram of traditionally focusing a dual-layer optical disk 26. While the optical information reproducing device 10 is applied to a dual-layer optical disk 26 for performing a layer jump operation, the objective lens of the pick-up head 12 will move from a first focus 27 to a second focus 28 over the optical disk 26. First of all, the digital signal processor 16 sends a kick pulse signal 29 in response to a layer jump command of the microprocessor 18. The kick pulse signal 29 is then sent to the actuator 24 through the servo controller 20 and driver circuit 22. The actuator 24, in response to the kick pulse signal 29, kicks the objective lens of pick-up head 12 out of the first focus 27 of the optical disk 26. When the objective lens moves closely to the second focus 28 of the optical disk 26, the digital signal processor 16 sends a brake pulse signal 25 in response to a brake command of the microprocessor 18. The brake pulse command 25 is then sent to the actuator 24 through the servo controller 20 and driver circuit 22. The actuator 24 locks the objective lens of the pick-up head 12 over the second focus 28 of the optical disk 26.

Please refer to FIG. 3 and FIG. 4. FIG. 3 shows a relative control signal diagram of the objective lens while unlocking the second focus 28. FIG. 4 shows another relative control signal diagram of the objective lens while unlocking the second focus 28. Focus error signal $S_e$ shown in FIG. 3 and FIG. 4 represents an error signal of the relative position between the objective lens and focus 27 and 28, which is generated by the pick-up head 12. Control pulse signal $S_c$ shown in FIG. 3 and FIG. 4 represents a force signal for driving the objective lens, which is generated by the digital signal processor 16. RF Level signal $S_r$ shown in FIG. 3 and FIG. 4 represents a reading intensity signal of the pick-up head 12, which is generated by the pick-up head 12. However, due to the deviation of the optical disk 26 and the difference of the actuator 24, while the optical information reproducing device 10 performing the layer jump operation on dual-layer disk 26, it is not able to predict precisely the speed with which the objective lens moving closely to the second focus 28 of the optical disk 26. If the relative speed between the objective lens and the second focus 28 is too high and the braking force applied to the objective lens is constant, the objective lens often overshoots and unlocks the second focus 28, wherein the focus error signal $S_e$ has a diversifying trend with time as shown in FIG. 3. On the other hand, if the objective lens can't reach the second focus 28 in time, it also won't be able to react immediately and speed up the objective lens to lock the second focus 28 as shown in FIG. 4. Therefore while performing the layer jump operation over the dual-layer disk 26, the conventional control method of the focus speed is unstable with respect to the objective lens of the optical information reproducing device 10.

SUMMARY OF THE INVENTION

It is therefore an objective of the present invention to provide a method for controlling a focus speed of a pick-up head to solve the above mentioned problem.

In a preferred embodiment, the present invention provides a method for controlling a focus speed of a pick-up head while performing a layer jump operation over a multi-layer optical disk in an optical information reproducing device. The optical information reproducing device includes the pick-up head, an actuator and a counter. The pick-up head has an objective lens positioned over a first focus of the multi-layer optical disk, in response to a signal reflected from the multi-layer optical disk, will generate a RF level signal. The actuator is electronically coupled to the pick-up head for driving the objective lens to perform the layer jump operation in response to a kick pulse signal. The counter generates a counter value in response to the kick pulse signal. The method comprises the steps of sending the kick pulse signal to the actuator for kicking the objective lens out of the first focus; processing the RF level signal and the counter value for generating a speed control data according to a predetermined procedure; and driving the objective lens to a second focus through the actuator in response to the speed control data. When the closing speed between the objective lens and the second focus is too high, the actuator will apply a greater braking force on the objective lens. When the closing speed between the objective lens and the second focus is too low, the actuator will apply a weaker braking force on the objective lens. If the objective lens can't reach the second focus in time, the actuator will apply a speeding force on the objective lens. Therefore, the optical information reproducing device applied with the method of the present invention will have a stable layer jump operation.

This and other objectives of the present invention will no doubt become obvious to those of ordinary skill in the art after having read the following detailed description of the preferred embodiment which is illustrated in the various drawings and figures.

DETAILED DESCRIPTION OF THE PREFERRED EMBODIMENT

Figure 1:
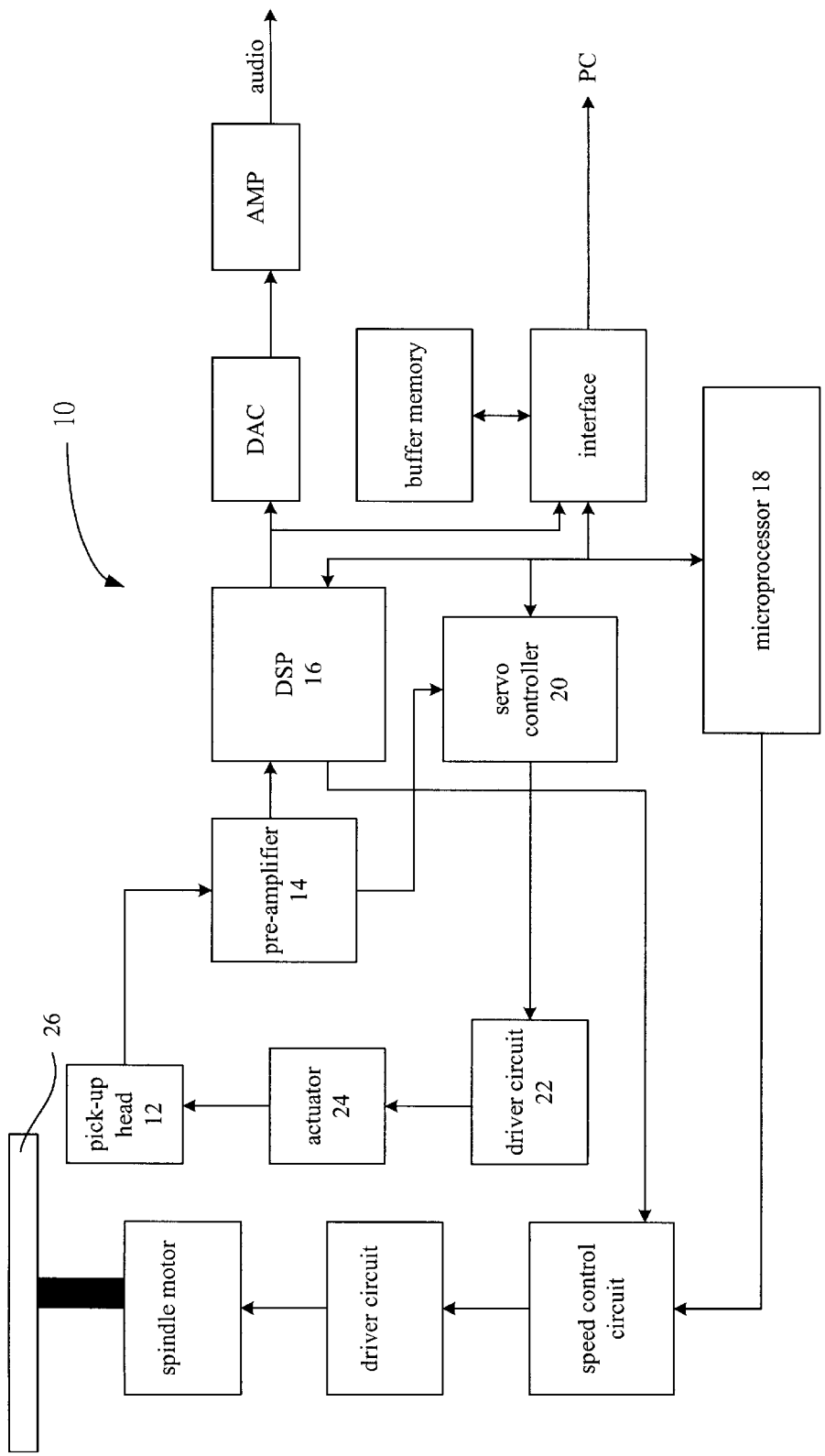
FIG. 1 is a function block diagram of an optical information reproducing apparatus according to the prior art.
Figure 2:
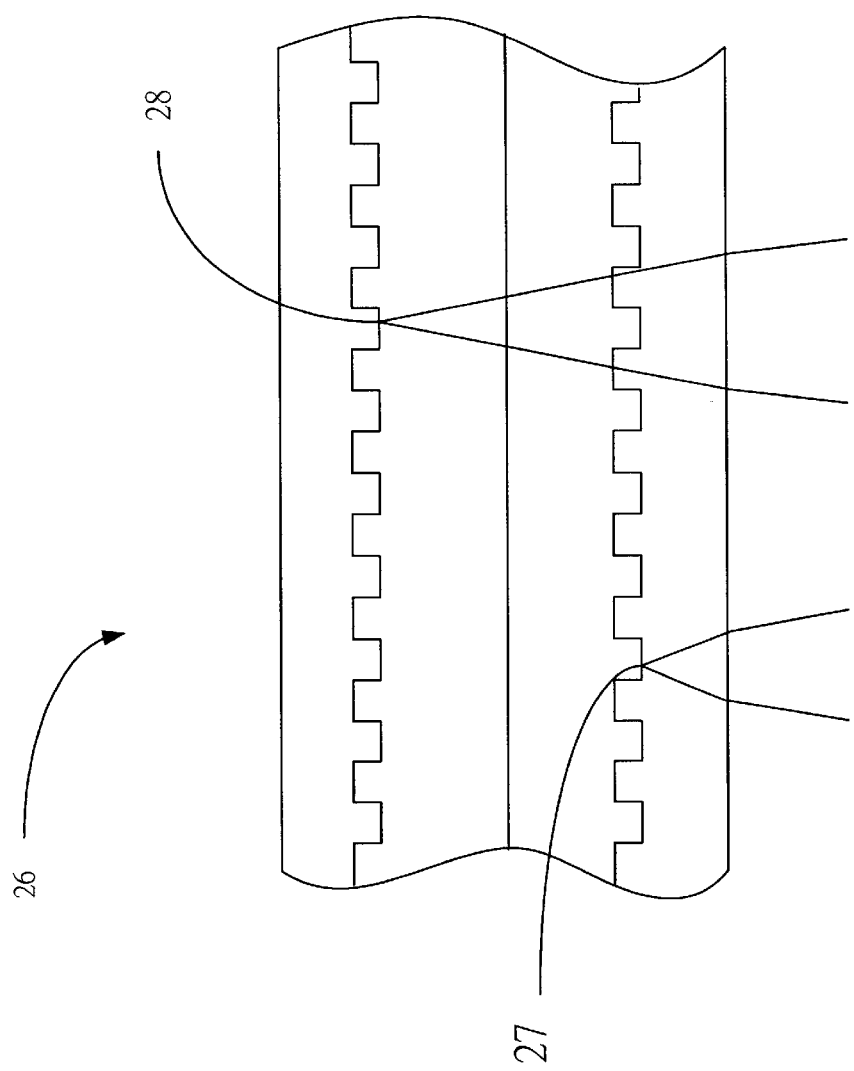
FIG. 2 is a schematic diagram of focusing of a dual-layer optical disk according to the prior art.
Figure 3:
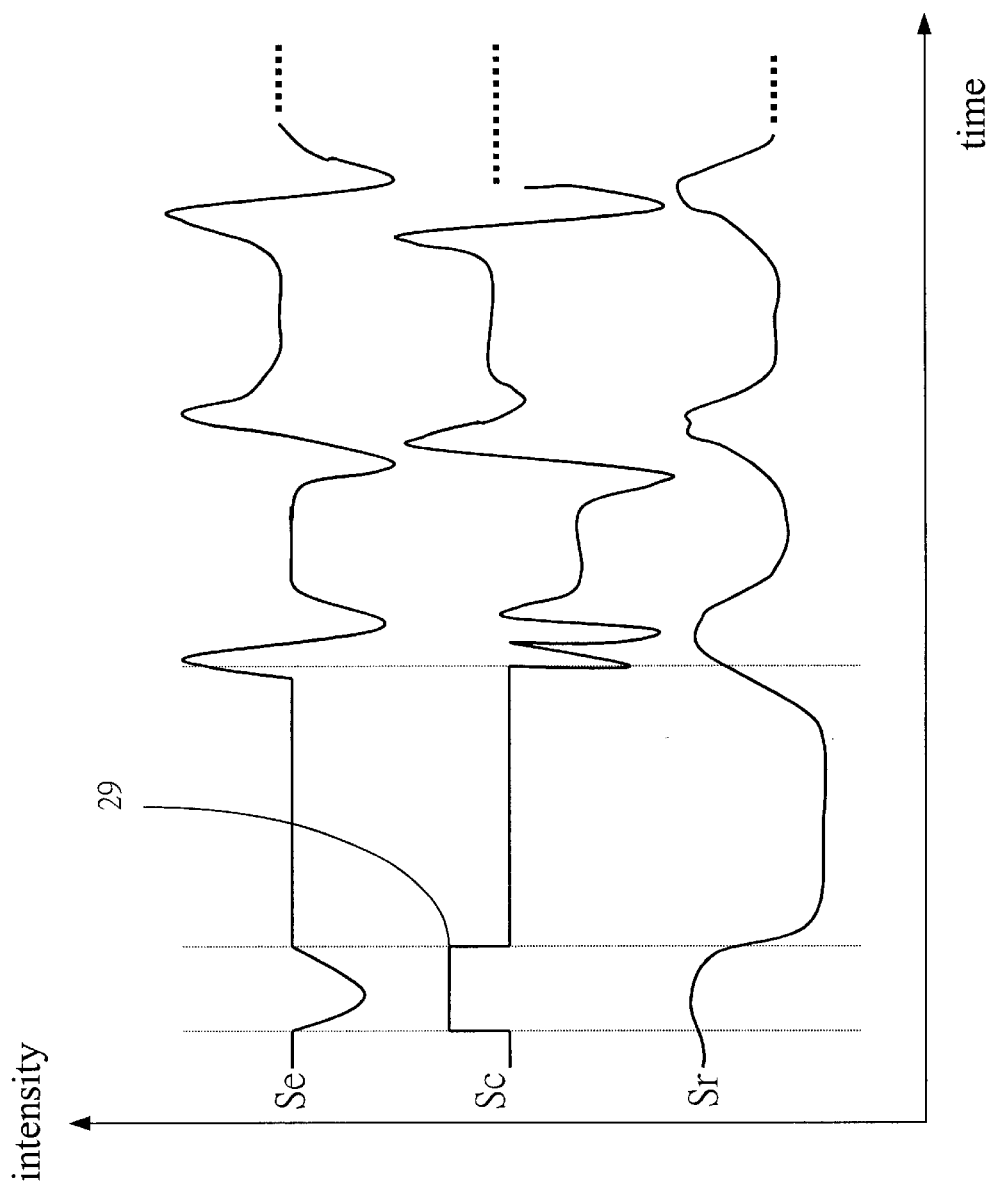
FIG. 3 shows a relative control signal diagram of the objective lens while unlocking the second focus.
Figure 4:
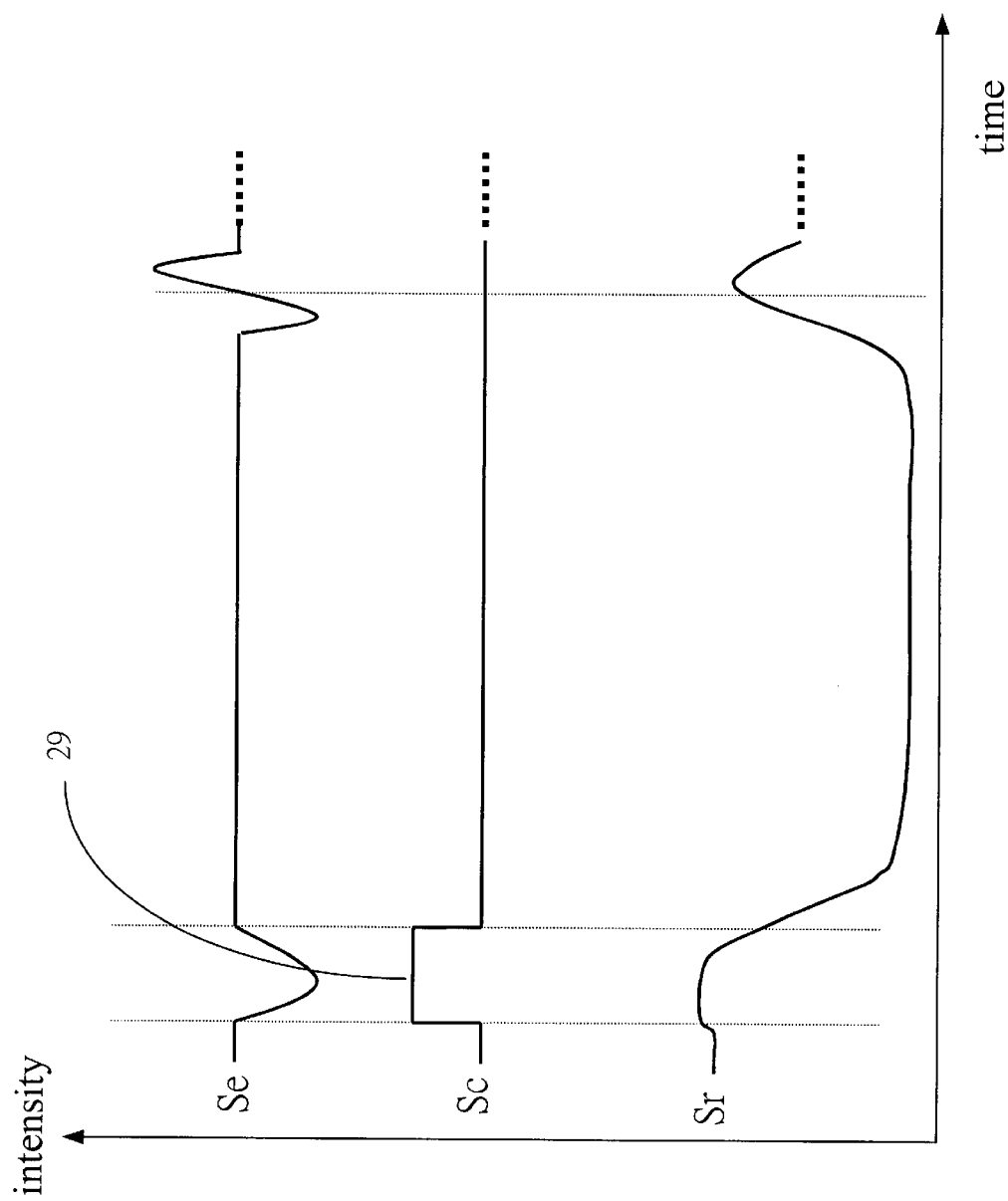
FIG. 4 shows another relative control signal diagram of the objective lens while unlocking the second focus.
Figure 5:
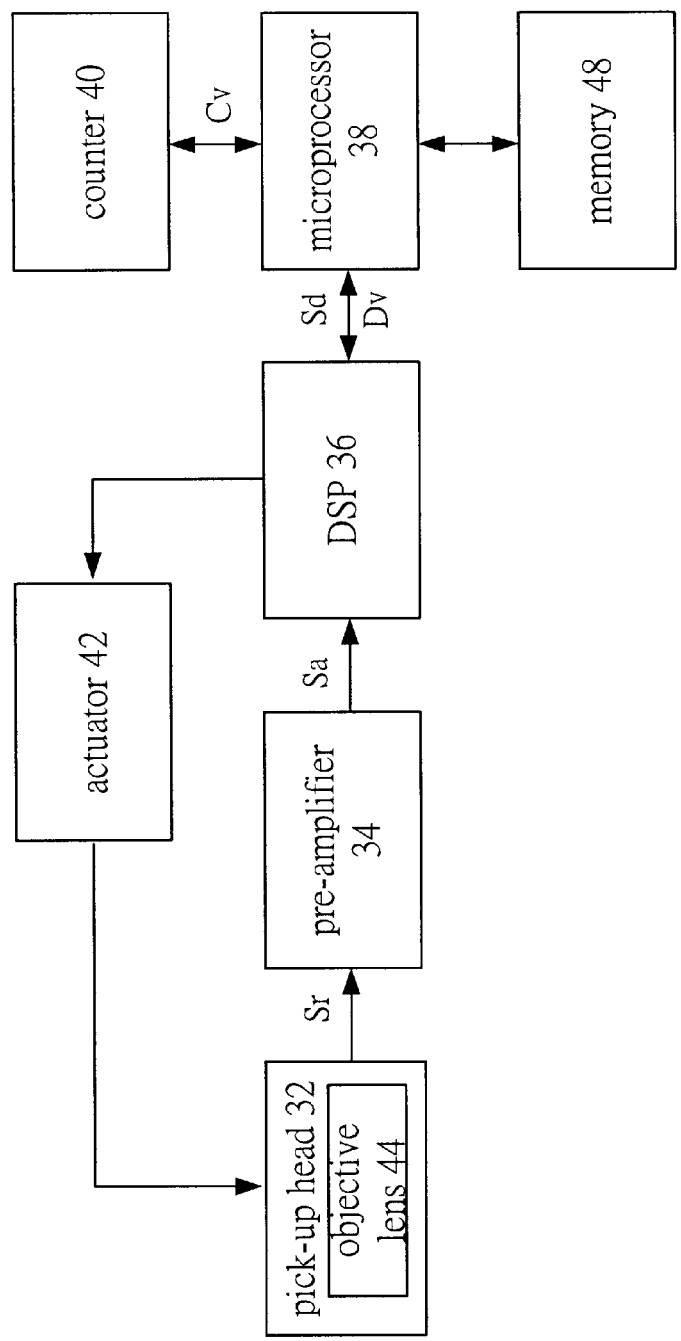
FIG. 5 is a function block diagram of an optical information reproducing apparatus according to the present invention.

Please refer to FIG. 5. FIG. 5 shows a function block diagram of an optical information reproducing device 30 according to the present invention. The present invention provides a method for controlling a focus speed of a pick-up head 32 while performing a layer jump operation over a dual-layer optical disk 31 in an optical information reproducing device 30. The optical information reproducing device 30 comprises the pick-up head 32, a pre-amplifier 34, a digital signal processor 36, a microprocessor 38, a counter 40 and an actuator 42. The pick-up head 32, in response to a signal reflected from the optical disk 31, generates a RF level signal $S_r$. The pick-up head 32 has an objective lens 44 positioned over a first focus 27 as shown in FIG. 2 of the optical disk 31. The pre-amplifier 34 is electronically connected to the pick-up head 32 for amplifying the RF Level signal $S_r$ and generating an analog reading signal $S_a$. The digital signal processor 36 is electronically connected to the pre-amplifier 34 for processing the analog reading signal $S_a$ and generating a digital reading signal $S_d$. The microprocessor 38 is electronically connected to the digital signal processor 36 for processing the digital reading signal $S_d$. The counter 40 is electronically connected to the microprocessor 38 for generating a counter value $C_v$. The actuator 42 is electronically connected to the pick-up head 32 and digital signal processor 36 for driving the objective lens 44 to perform the layer jump operation.

Figure 6:
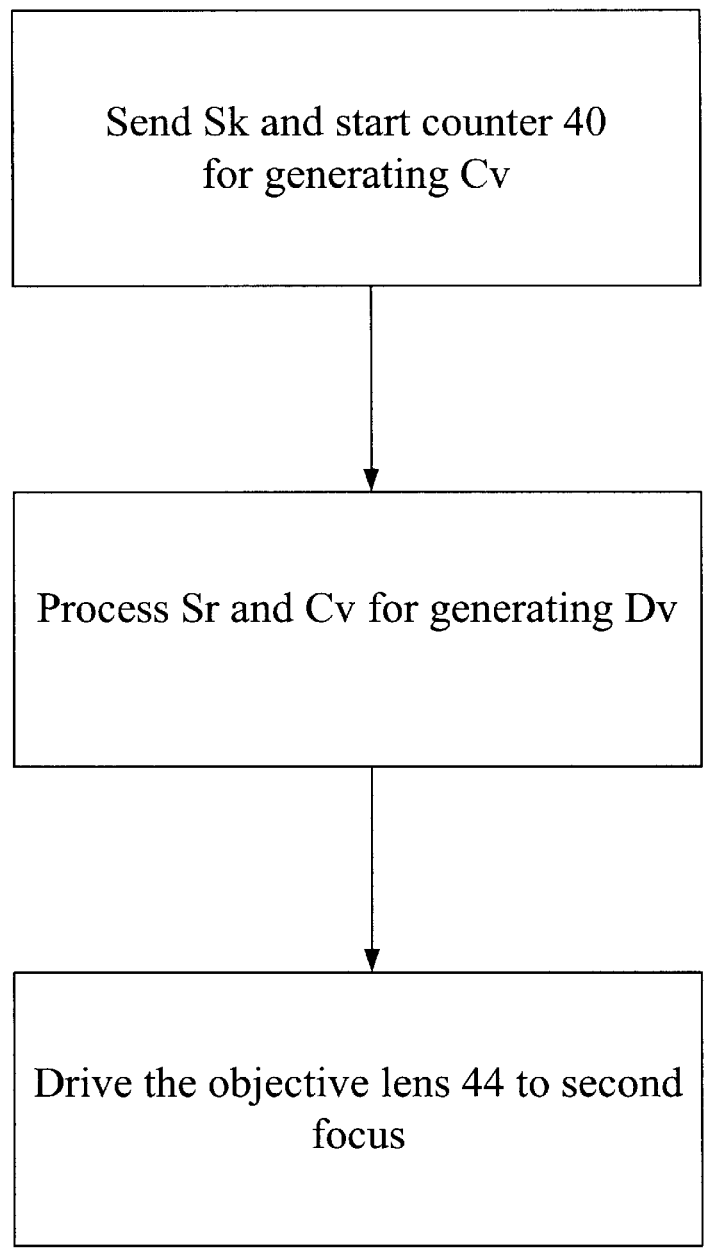
FIG. 6 is a flow chart of the method according to the present invention.

Please refer to FIG. 6. FIG. 6 is a flow chart of the method according to the present invention. The method of the present invention comprises the following steps.

First of all, the digital signal processor 36 sends a kick pulse signal $S_k$ to the actuator 42 in response to a jump layer command from the microprocessor 38 for kicking the objective lens 44 out of the first focus of the optical disk 31 and concurrently starting the counter 40 to generate the counter value $C_v$.

Secondly, the microprocessor 38 processes the RF level signal $S_r$ and the counter value $C_v$ for generating a speed control data $D_v$ according to a predetermined procedure 46.

Lastly, the actuator 42 drives the objective lens 44 to a second focus 28 as shown in FIG. 2 of the optical disk 31 in response to the speed control data $D_v$ from the digital signal processor 36.

Please refer to FIG. 5. The optical information reproducing device 30 further comprises a memory 48 electronically connected to the microprocessor 38 for storing a look-up figure representing the relationship between the braking force and counter value $C_v$. Furthermore, the memory 48 can be a firmware.

Figure 7:
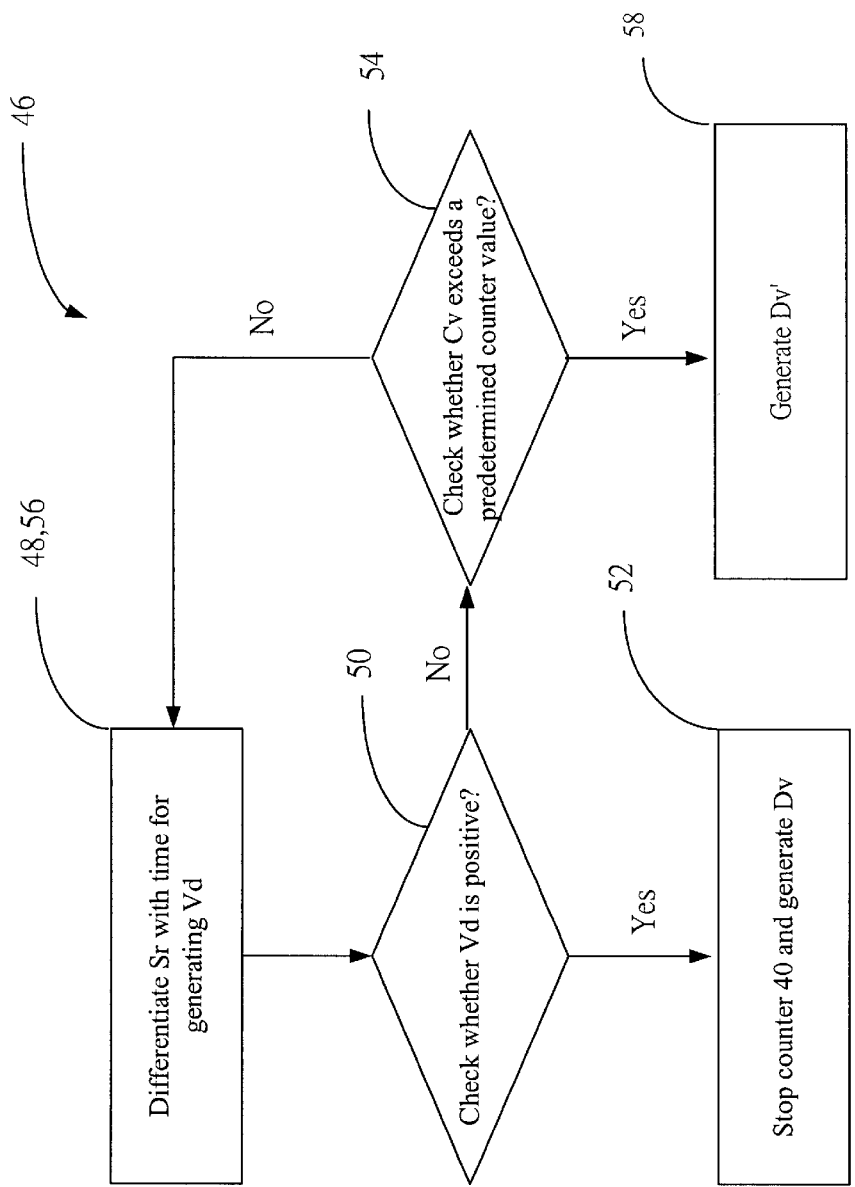
FIG. 7 is a flow chart of the predetermined procedure shown in FIG. 6.
Figure 8:
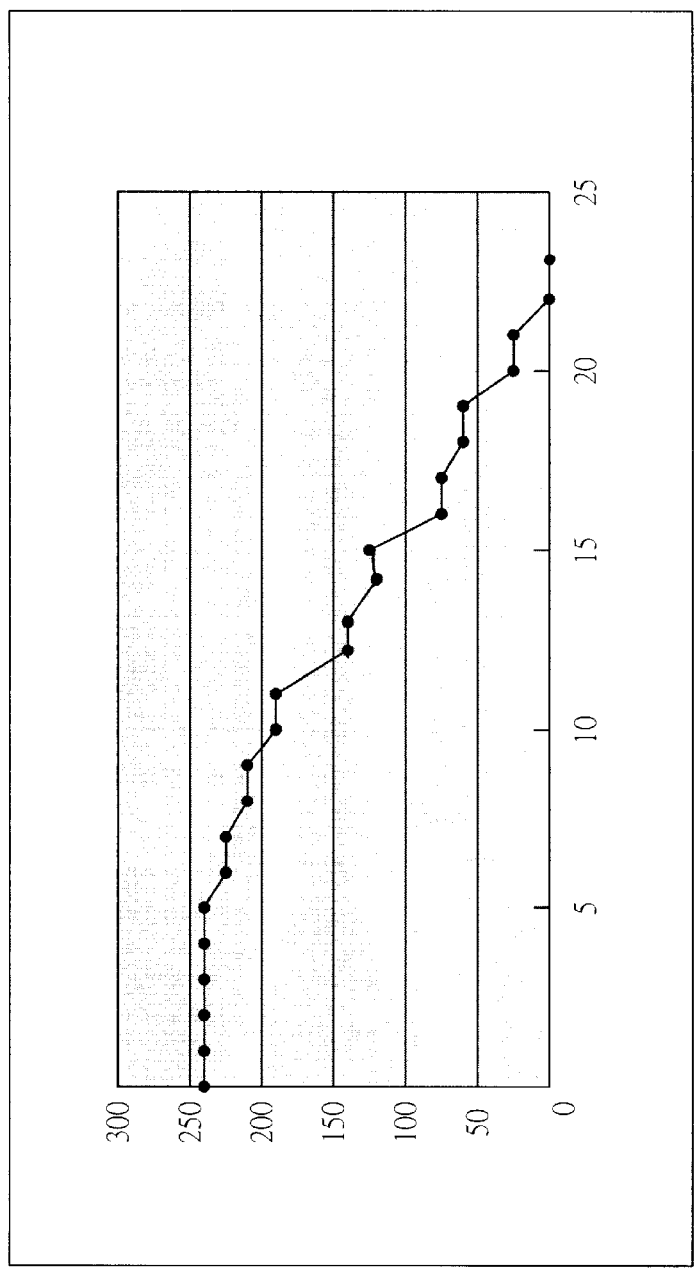
FIG. 8 is a look-up figure of the present invention.

Please refer to FIG. 7 and FIG. 8. FIG. 7 is a flow chart of the predetermined procedure 46 shown in FIG. 6. FIG. 8 is a look-up figure of the present invention, wherein x-axis represents the counter value $C_v$ of counter 40, y-axis represents a control impulse voltage (mV) of the actuator 42, and the control impulse voltage represents the braking force applied on the objective lens 44. The predetermined procedure 46 of the present invention is as follows.

Step 48: differentiating the RF level signal $S_r$ with time for generating a RF differential value $V_d$;

Step 50: checking whether the polarity of the RF differential value $V_d$ is positive;

Step 52: if the polarity of the RF differential value $V_d$ is positive, stopping the counter 40 and generating a braking control data $D_v$ for braking the objective lens 44 in response to the counter value Cv according to look-up figure;

Step 54: if the polarity of the RF differential value $V_d$ is not positive, checking whether counter value $C_v$ exceeds a pre-determined counter value;

Step 56: if NO in step 54, executing step 48; and

Step 58: if YES in step 54, generating a speed control data $D_v'$ for speeding up the objective lens 44.

Figure 9:
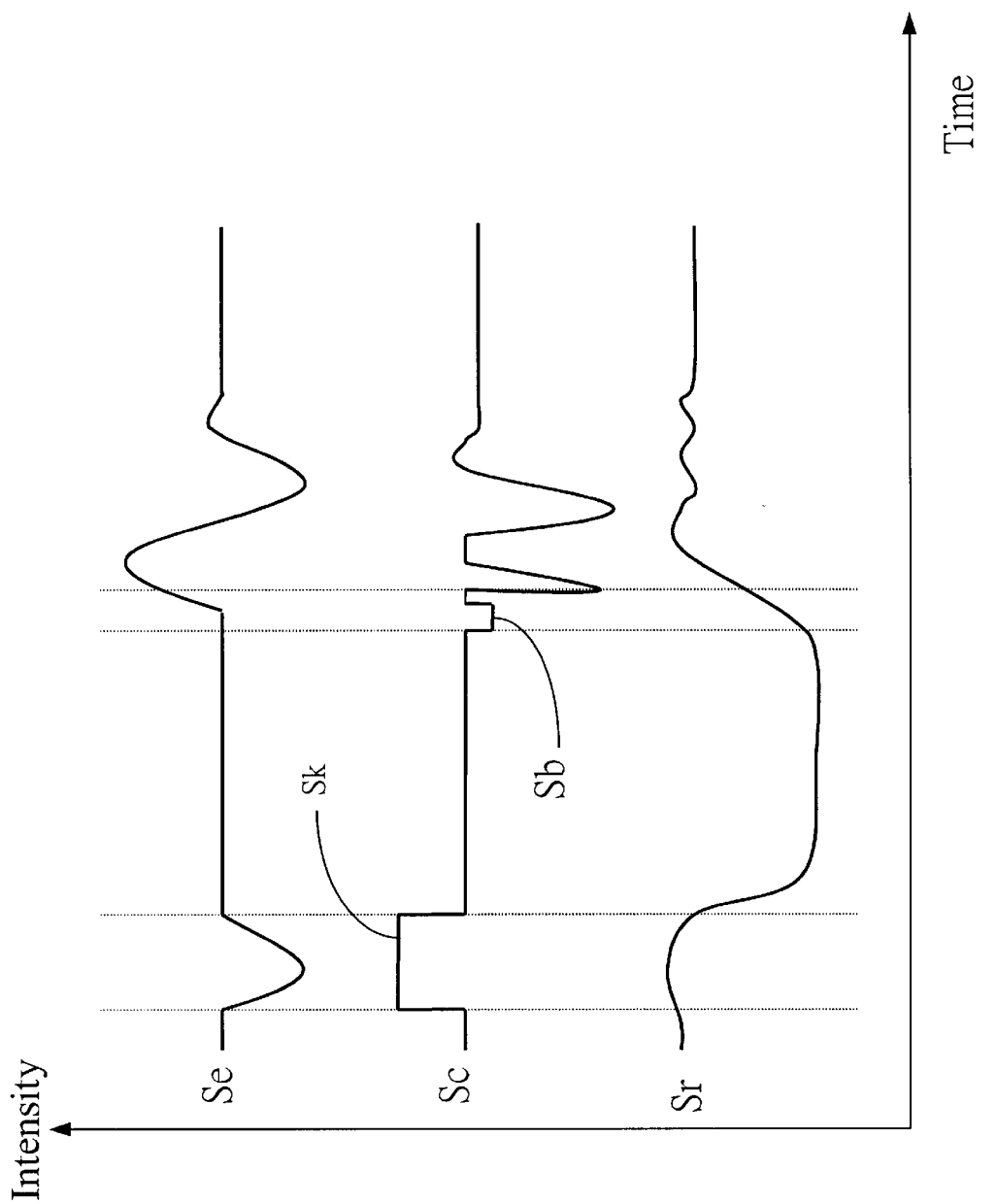
FIG. 9 shows a relative control signal diagram of the objective lens while locking the second focus.

Please refer to FIG. 9. FIG. 9 shows a relative control signal diagram of the objective lens 44 while locking the second focus. Focus error signal Se shown in FIG. 9 represents an error signal of the relative position between the objective lens 44 and second focus, which is generated by the pick-up head 32. Control pulse signal $S_c$ shown in FIG. 9 represents a force signal for driving the objective lens 44, which is generated by the digital signal processor 36. RF Level signal $S_r$ shown in FIG. 9 represents a reading intensity signal of the pick-up head 32, which is generated by the pick-up head 32. While applying the method of the present invention on the optical information reproducing apparatus 30 to perform the jump layer operation over a dual-layer disk 31, the digital signal processor 36 first sends the kick pulse signal $S_k$ to the actuator 42 in response to a jump layer command from the microprocessor 38 for kicking the objective lens 44 out of the first focus of the optical disk 31. And then, the microprocessor 38 processes the RF Level signal $S_r$ and the counter value $C_v$ according to the predetermined procedure 46 for generating the speed control data $D_v$ and $D_v'$. When the relative closing speed between the objective lens 44 and second focus is higher, i.e. the counter value $C_v$ is smaller, the microprocessor 38 sends a speed control data $D_v$ representing a higher brake force to the digital signal processor 36. The digital signal processor 36 generates a braking pulse signal $S_b$ in response to the speed control data $D_v$. Lastly, the actuator 42, in response to the brake pulse signal $S_b$, drives the objective lens 44 with the higher brake force to the second focus of the optical disk 31 as shown in FIG. 9.

Figure 10:
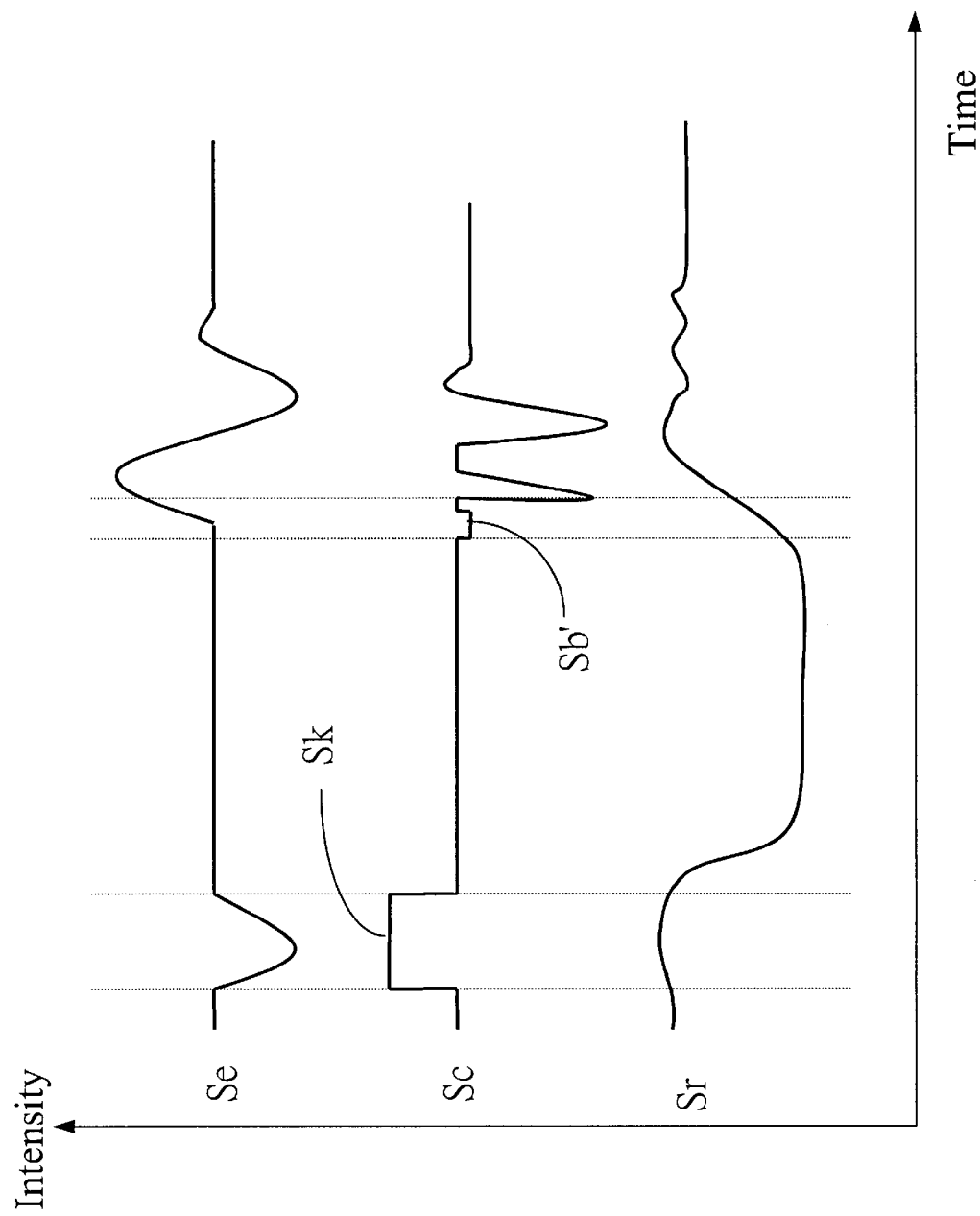
FIG. 10 shows another relative control signal diagram of the objective lens while locking the second focus.

Please refer to FIG. 10. FIG. 10 shows another relative control signal diagram of the objective lens 44 while locking the second focus. When the relative closing speed between the objective lens 44 and second layer focus is lower, i.e. the counter value $C_v$ is higher, the microprocessor 38 sends a speed controlling data $D_v$ representing a smaller brake force to the digital signal processor 36. The digital signal processor 36 then generates a brake pulse signal $S_{b'}$ in response to the speed control data $D_v$. Lastly, the actuator 42, in response to the brake pulse signal $S_{b'}$, drives the objective lens 44 with a smaller brake force to the second focus of optical disk 31 as shown in FIG. 10.

Figure 11:
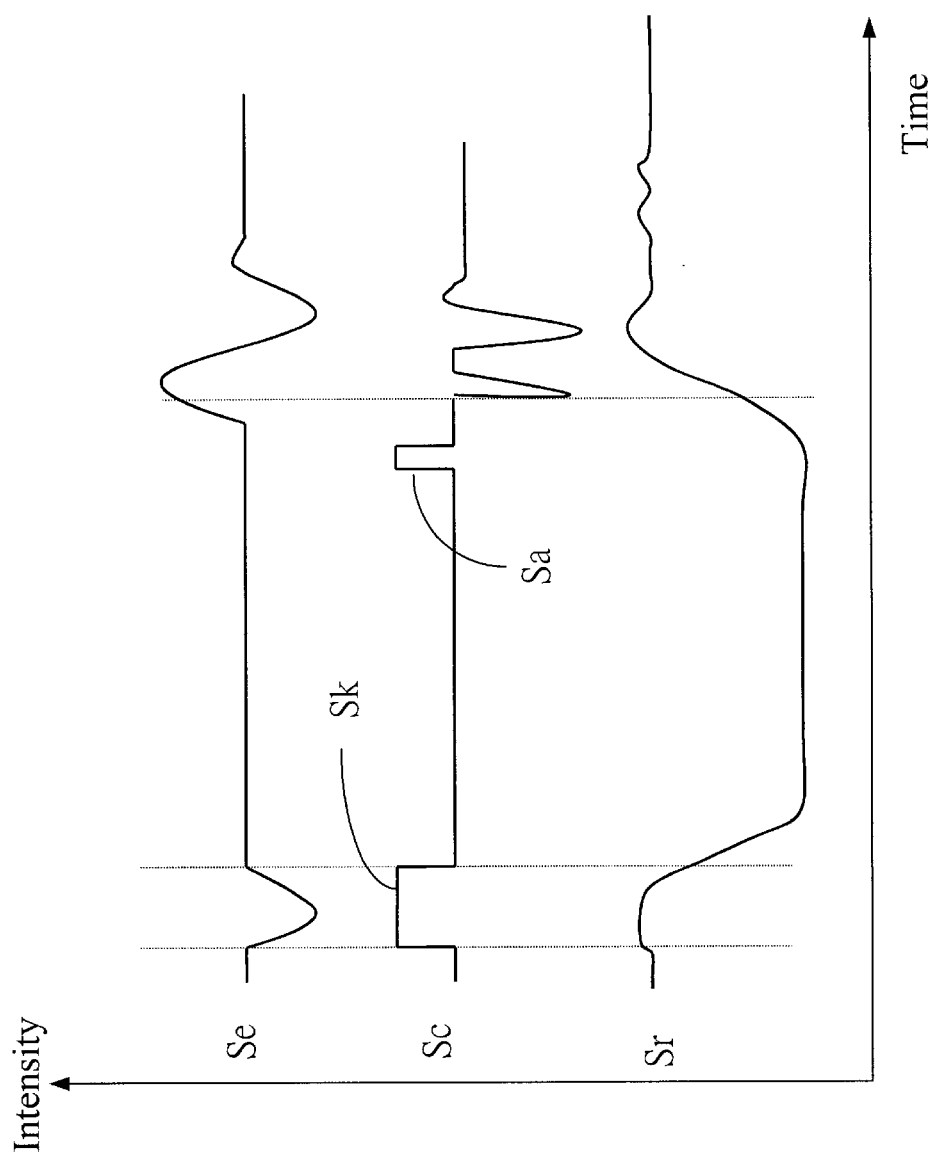
FIG. 11 shows another relative control signal diagram of the objective lens while locking the second focus.

Please refer to FIG. 11. FIG. 11 shows another relative control signal diagram of the objective lens 44 while locking the second focus. When the relative separating speed between the objective lens 44 and the second focus is found, i.e. the counter value $C_v$ proceeds a predetermined value, the microprocessor 38 sends a speed control data $D_v$ representing speeding up the objective lens 44 to the digital signal processor 36. The digital signal processor 36 generates a speeding pulse signal $S_a$ in response to the speed control data $D_v$. Lastly, the actuator 42, in response to the speeding pulse signal $S_a$, drives the objective lens 44 with a speeding force to the second focus 28 of the optical disk 31 as shown in FIG. 11.

In contrast to the prior art, the present invention provides a method for controlling the focus speed of the pick-up head 32 while performing the layer jump operation over the dual-layer optical disk 31 in the optical information reproducing apparatus 30. When the objective lens 44 moves closely to the second focus of the optical disk 31, the differential value of RF Level signal and the counter value $C_v$ are applied to predict the relative speed between the objective lens 44 and focus. If the counter value $C_v$ is small, i.e. the closing speed between the objective lens 44 and focus is too high, the high brake force is applied to the objective lens 44 for locking the focus. If the counter value $C_v$ is large, i.e. the closing speed between the objective lens 44 and focus is high, the lower brake force is applied to the objective lens 44 for locking the focus. If the counter value $C_v$ proceeds a predetermined value, i.e. the objective lens 44 can not reach the focus, the speeding force is applied to the objective lens 44 for locking the focus. As a result, the optical information reproducing device 30 applied with the method of the present invention will perform a layer jump operation.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. In an optical information reproducing apparatus, a method for controlling a focus speed of a pick-up head while performing a layer jump operation over a multi-layer optical disk, the optical information reproducing apparatus comprising the pick-up head, an actuator and a counter, the pick-up head comprising an objective lens positioned over a first focus of the multi-layer optical disk and generating an RF level signal in response to a signal reflected from the multi-layer optical disk, the actuator being electronically coupled to the pick-up head for driving the objective lens to perform the layer jump operation in response to a kick pulse signal, the counter for generating a counter value in response to the kick pulse signal, the method comprising:

sending the kick pulse signal to the actuator for kicking the objective lens out of the first focus, and concurrently starting the counter for generating the counter value;

processing the RF level signal and the counter value for generating a speed control data according to a predetermined procedure; and driving the objective lens to a second focus through the actuator in response to the speed control data, wherein the predetermined procedure comprises the steps of:
(a) differentiating the RF level signal with time for generating an RF differential value;
(b) checking whether the polarity of the RF differential value is positive;
(c) if NO in step (b), checking whether the counter value exceeds a predetermined counter value; and
(d) if NO in step (c), executing step (a), if YES in step (c), generating the speed control data.

2. The method of claim 1 wherein the predetermined procedure further comprises the step of, if YES in step (b), stopping the counter and generating the speed control data in response to the counter value according to a lookup table.

3. The method of claim 2 wherein the optical information reproducing apparatus further comprises a microprocessor electronically connected to the pick-up head and the actuator for executing the stamps of the predetermined procedure.

4. The method of claim 3 wherein the optical information reproducing apparatus further comprises a memory electronically connected to the microprocessor for storing the lookup table.

5. The method of claim 4 wherein the memory is a firmware.

* * * * *